United States Patent
Qiang et al.

(10) Patent No.: US 9,313,094 B2
(45) Date of Patent: Apr. 12, 2016

(54) NODE AND METHOD FOR SIGNALLING IN A PROXY MOBILE INTERNET PROTOCOL BASED NETWORK

(71) Applicant: Telefonaktiebolaget L M Ericsson (publ), Stockholm (SE)

(72) Inventors: Zu Qiang, Kirkland (CA); Yong Yang, Mölndal (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 88 days.

(21) Appl. No.: 13/661,067

(22) Filed: Oct. 26, 2012

(65) Prior Publication Data

US 2013/0044608 A1 Feb. 21, 2013

Related U.S. Application Data

(60) Provisional application No. 61/555,116, filed on Nov. 3, 2011.

(51) Int. Cl.

| | |
|---|---|
| *H04W 24/04* | (2009.01) |
| *H04W 76/02* | (2009.01) |
| *H04L 12/24* | (2006.01) |
| *H04L 29/06* | (2006.01) |
| *H04L 29/14* | (2006.01) |
| *H04W 8/30* | (2009.01) |
| *H04W 88/16* | (2009.01) |

(52) U.S. Cl.
CPC .......... *H04L 41/0677* (2013.01); *H04L 65/105* (2013.01); *H04L 65/1016* (2013.01); *H04L 65/1046* (2013.01); *H04L 69/40* (2013.01); *H04W 24/04* (2013.01); *H04L 41/0663* (2013.01); *H04L 41/0668* (2013.01); *H04W 8/30* (2013.01); *H04W 88/16* (2013.01); *Y02B 60/43* (2013.01)

(58) Field of Classification Search
USPC .................................................. 370/216–252
See application file for complete search history.

(56) References Cited

U.S. PATENT DOCUMENTS

| | | | |
|---|---|---|---|
| 2008/0175157 A1* | 7/2008 | Lim et al. ....................... | 370/242 |
| 2009/0097399 A1* | 4/2009 | Mahasoom et al. .......... | 370/216 |
| 2010/0046362 A1* | 2/2010 | Zhu et al. ...................... | 370/216 |
| 2011/0128913 A1* | 6/2011 | Chowdhury et al. ......... | 370/328 |
| 2012/0269167 A1* | 10/2012 | Velev et al. ................... | 370/331 |

FOREIGN PATENT DOCUMENTS

WO   WO 2009039894 A1 *   4/2009

OTHER PUBLICATIONS

Route Optimization for Proxy Mobile IPv6 in IMS Network, All Pages, Published 2010.*

(Continued)

*Primary Examiner* — Brandon Renner
(74) *Attorney, Agent, or Firm* — Rothwell, Figg, Ernst & Manbeck, p.c.

(57) ABSTRACT

Example embodiments are presented herein which relate to signaling in the presence of a Proxy-Call Session Control Function (P-CSCF) node failure or restart in a Proxy Mobile Internet Protocol (PMIP) based network. The example embodiments provide a means for a PGW or GGSN, which functions as a Local Mobility Anchor (LMA), to provide an update or indication of the P-CSCF failure or restart directly to a Serving Gateway, which functions as a Mobility Access Gateway (MAG).

26 Claims, 8 Drawing Sheets

(56) References Cited

OTHER PUBLICATIONS

3GPP, Universal Mobile Telecommunications System, Jun. 2011, Version 10.1.0, All pages.*
"Digital Cellular Telecommunications System (Phase 2+); Universal Mobile Telecommunications System (UMTS); LTE; IMS Restoration Procedures (3GPP TS 23.380 version 11.0.0 Release 11)" Technical Specification, European Telecommunications Standards Institute (ETSI), 650, Route Des Lucioles; F-06921 Sophia-Antipolis; France [Online] vol. 3GPP CT 4, No. V11.0.0, Oct. 24, 2012, 17 pages, XP014075178.
International Search Report and Written Opinion issued on Jan. 15, 2014 in corresponding International application No. PCT/EP2013/068812, 10 pages.
3GPP TS 23.401; V11.3.0 (Sep. 2012); 3rd Generation Partnership Project; Technical Specification Group Services and System Aspects; General Packet Radio Service (GPRS) Enhancements for Evolved Universal Terrestrial Radio Access Network (E-UTRAN) Access (Release 11); 283 pages.
3GPP TS 23.402; V11.4.0 (Sep. 2012); 3rd Generation Partnership Project; Technical Specification Group Services and System Aspects; Architecture Enhancements for non-3GPP Accesses (Release 11); 252 pages.
3GPP TS 29.274; V11.4.0 (Sep. 2012); 3rd Generation Partnership Project; Technical Specification Group Core Network and Terminals; 3GPP Evolved Packet System (EPS); Evolved General Packet Radio Service (GPRS); Tunnelling Protocol for Control Plane (GTPv2-C); Stage 3 (Release 11); 219 pages.
3GPP TS 29.275; V11.4.0 (Sep. 2012); 3rd Generation Partnership Project; Technical Specification Group Core Network and Terminals; Proxy Mobile IPv6 (PMIPv6) Based Mobility and Tunnelling Protocols; Stage 3 (Release 11); 79 pages.
3GPP TS 29.276; V11.0.0 (Sep. 2012); 3rd Generation Partnership Project; Technical Specification Group Core Network and Terminals; 3GPP Evolved Packet System (EPS); Optimized Handover Procedures and Protocols Between E-UTRAN Access and cdma2000 HRPD Access; Stage 3 (Release 11); 21 pages.

* cited by examiner

NODE AND METHOD FOR SIGNALLING IN A PROXY MOBILE INTERNET PROTOCOL BASED NETWORK

RELATED APPLICATIONS

This application claims the benefit of U.S. Provisional Application No. 61/555,116, filed on Nov. 3, 2011. The entire teachings of the above application are incorporated herein by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

A Proxy Mobile Internet Protocol (PMIP) is a network-based mobility management mechanism. It is an amendment to Mobile IPv6 which allows mobility control to be moved from the mobile node to a proxy in the network. LTE supports PMIP over the S2, S5 and S8 interfaces.

SUMMARY

During wireless network operations, numerous procedures may be put in place, which deal with various update or failure scenarios. With respect to PMIPv6 based systems, various problems arise with such procedures. One example problem is that PMIPv6, as specified in 3GPP TS29.275, does not currently have a mechanism to allow the PGW, which acts as a LMA, to initiate an update towards the SGW, which acts as a MAG, to modify PDN connection related parameters. An example of such a parameter may be a Protocol Configuration Option (PCO). This is an example difference with respect to GTPv2 based systems, where the PGW may use an Update Bearer Request message to update PDN connection related parameters. In some instances, the PGW may need to provide a new network address as well, for example a DNS address. However, this too is not possible with current PMIP based systems.

3GPP has introduced what is so called off-path signaling, which allows the PGW to pass some PDN connection related parameters via the PCRF to the SGW. Example messages utilized in such off-path signaling are Credit Control Request/Response messages over Gx interface and Re-authorization Request/Answer messages over the Gxx interface. However such off-path signaling approach implies extra signaling over Gx and Gxx interface and unnecessarily requires the PCRF to function as a signaling relay node, which is not part of defined function for PCRF.

Thus, at least one example object of some of the example embodiments presented herein may be to provide improved PMIP based procedures for update and/or failure scenarios. An example advantage of some of the example embodiments may be that a PGW, functioning as a LMA, may directly provide indications or updated parameters to a SGW, functioning as a MAG, during failure or update procedures.

Accordingly, some of the example embodiments are directed towards a method, in a Local Mobility Anchor (LMA) node, for providing an indication of P-CSCF node failure or restart in a Proxy Mobile Internet Protocol (PMIP) based network. The method comprises sending, to a Mobile Access Gateway (MAG) node, a communication message, where the communication provides an indication of the P-CSCF node failure or restart in the PMIP based network.

Some of the example embodiments are directed towards a Local Mobility Anchor (LMA) node for providing an indication of a P-CSCF node failure or restart in a Proxy Mobile Internet Protocol (PMIP) based network. The LMA node comprises interface circuitry configured to send, to a Mobile Access Gateway (MAG) node, a communication message, where the communication provides an indication of the P-CSCF node failure or restart.

Some of the example embodiments are directed towards a method, in a Mobile Access Gateway (MAG) node, for Proxy Mobile Internet Protocol (PMIP) signaling in a presence of a P-CSCF node failure or restart in a PMIP based network. The method comprises receiving, from a Local Mobility Anchor (LMA) node, a communication message, where the communication provides an indication of the P-CSCF node failure or restart in the PMIP based network. The method further comprises updating at least one Packet Data Network (PDN) connection associated with the P-CSCF node failure or restart.

Some of the example embodiments are directed towards a Mobile Access Gateway (MAG) node for Proxy Mobile Internet Protocol (PMIP) signaling in a presence of a P-CSCF node failure or restart in a PMIP based network. The MAG node comprises interface circuitry configured to receive, from a Local Mobility Anchor (LMA) node, a communication message, where the communication provides an indication of the P-CSCF node failure or restart in the PMIP based network. The MAG node further comprises processing circuitry configured to update at least one Packet Data Network (PDN) connection associated with the P-CSCF node failure or restart.

DEFINITIONS

3GPP Third Generation Partnership Project
BSC Base Station Controller
eNodeB enhanced Node B
ePDG enhanced Packet Data Gateway
DNS Domain Name System
EPC Evolved Packet Core
GGSN Gateway GPRS Support Node
GPRS General Packet Radio Service
GSM Global System for Mobile Communications
GTP GPRS Tunneling Protocol
LMA Local Mobility Anchor
LTE Long Term Evolution
MAG Mobile Access Gateway
MME Mobility Management Entity
PBA Proxy Binding Acknowledgment
PBU Proxy Binding Update
P-CSCF Proxy-Call Session Control Function
PCO Protocol Configuration Option
PCRF Policy and Charging Rules Function
PDN Packet Data Network
PDP Packet Data Protocol
PGW PDN Gateway
PMIP Proxy Mobile Internet Protocol
RAN Radio Access Network
RBS Radio Base Station
RNC Radio Network Controller
SGW Serving Gateway
UE user equipment
UTMS Universal Mobile Telecommunications System
UTRAN UMTS Terrestrial Radio Access Network
WCDMA Wideband Code Division Multiple Access
WLAN Wireless Local Area Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
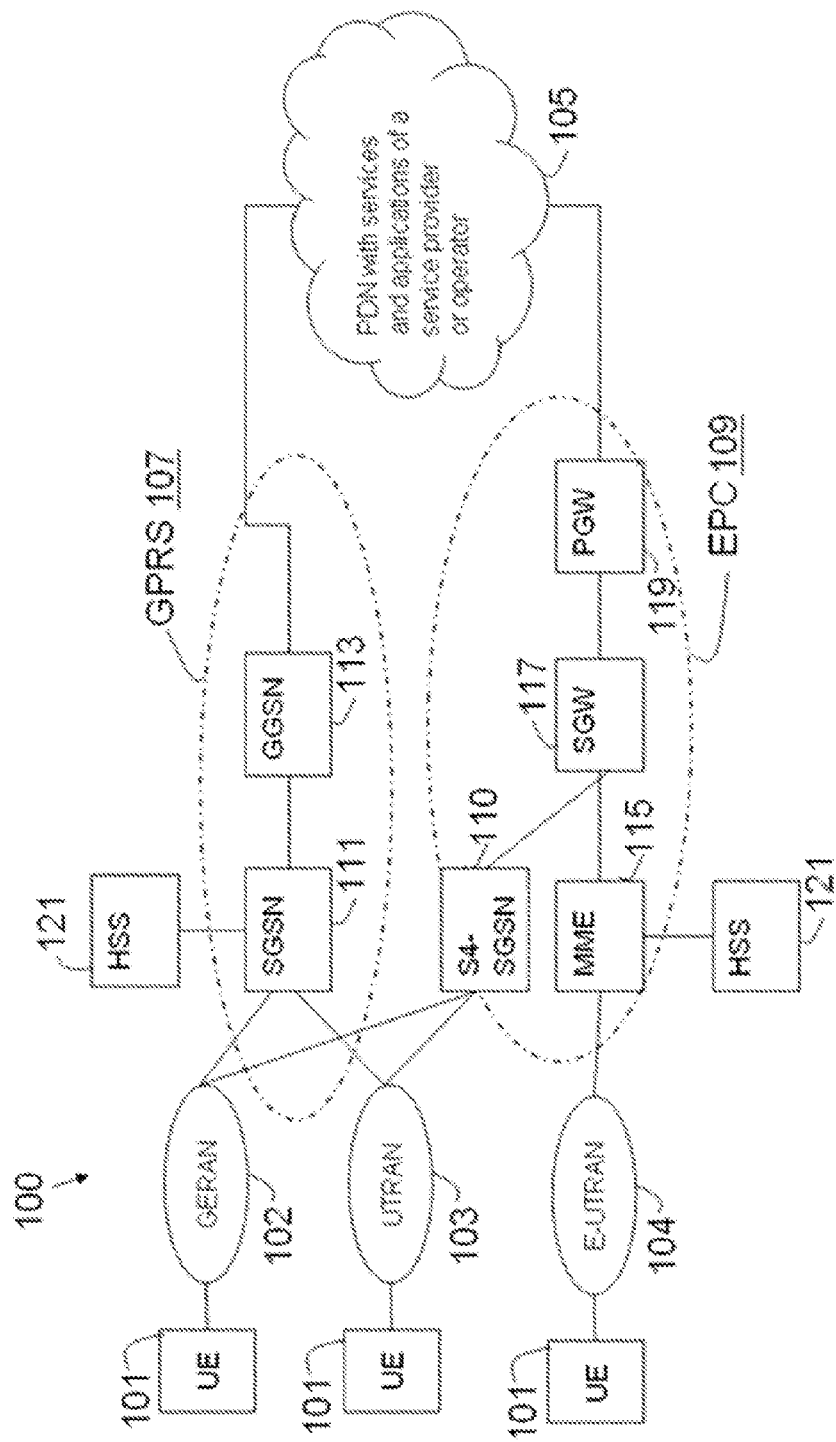
FIG. 1 is an illustration of an example wireless network utilizing PMIP based communications.

In order to provide a better explanation of the example embodiments presented herein, a problem will first be identified and discussed. FIG. 1 provides an example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the user equipment 101 to the operator of application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

It should be appreciated that the operator 105 may further comprise a Proxy-Call Session Control Function (P-CSCF) node. The P-CSCF node is the first point of contact for an IMS terminal or user equipment. The P-CSCF node is utilized mainly for providing the user-network interface which not only protects the network, but also the IMS terminal or user equipment.

In 3GPP CT4, a discussion was provided on how to inform a user equipment about a P-CSCF failure or re-start within a PMIP based S5/S8 communication network. The IMS restoration procedures have been standardized in CT4, in the time frame that the 3GPP Release 9 3GPP TS 23.380 was generated. This specification specifies a set of standardized procedures for automatic restoration of IMS.

In the 3GPP TS 23.380, there is a standardized procedure for the recovery after a P-CSCF failure in section 5. This section specifies that after the P-CSCF attachment is completed, the GGSN/PGW shall monitor the P-CSCF. If the P-CSCF failure is detected by the GGSN/PGW, the GGSN/PGW informs all attached user equipments of the failure and provides the user equipments with alternative P-CSCF addresses in the PCO information element via the SGW and MME. Thereafter, once the user equipment receives such data, the user equipment may choose the another (e.g., a functioning) P-CSCF based on the received information and initiate the IMS level registration procedure. By completion of this process, the user equipment may successfully continue the IMS services with minimal service disruption due to the P-CSCF failure.

Figure 2:
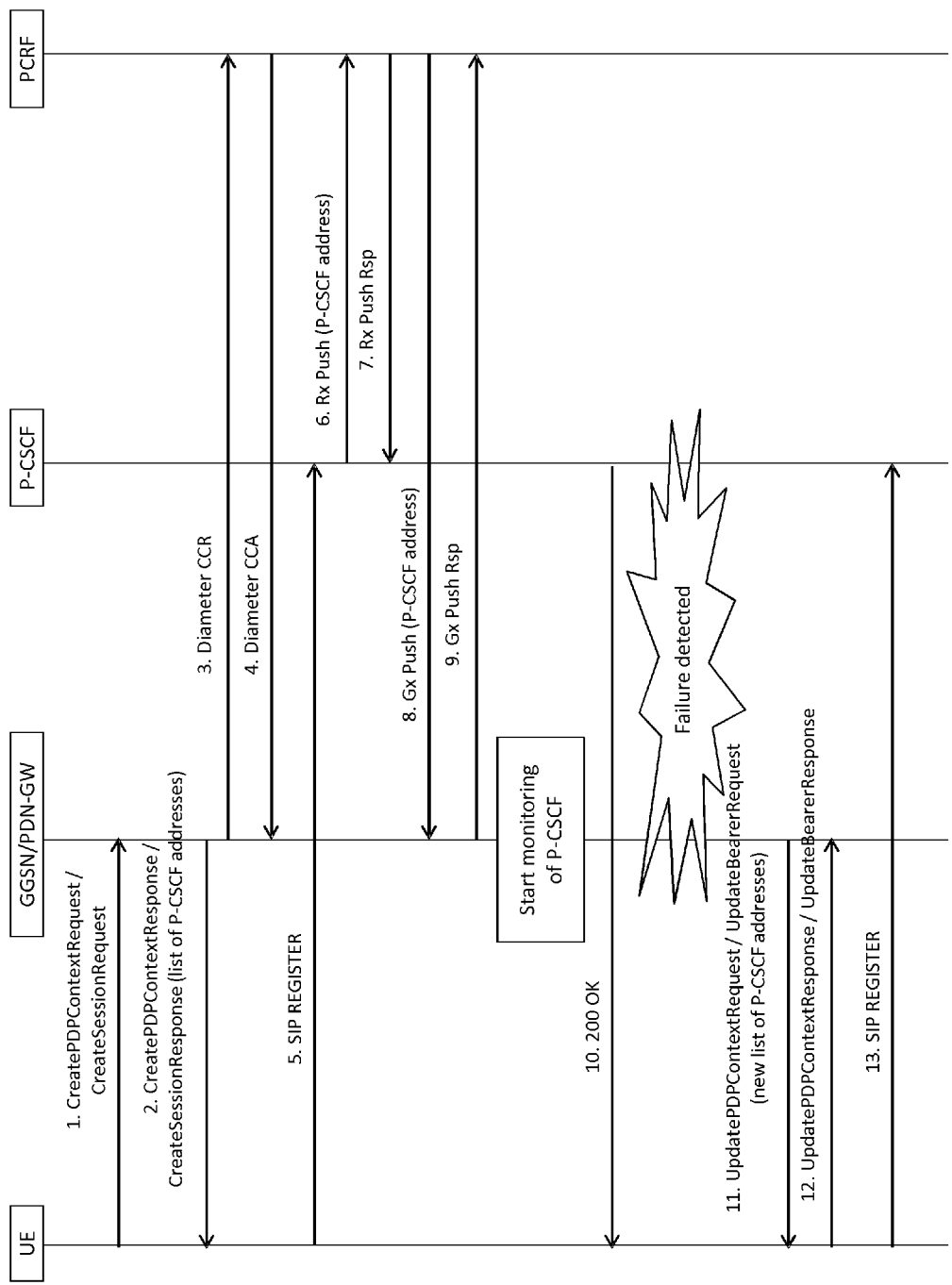
FIG. 2 is a message passing diagram for a PMIP based network.

FIG. 2 provides an example of network messaging during P-CSCF failure as described in 3GPP TS 23.380. First, the user equipment initiates an IP-CAN session by sending a Create PDP Context Request or a Create Bearer Request message to the GGSN or the PGW (message 1). Upon receiving the message, path discovery is performed and the GGSN or PGW sends a list of P-CSCF addresses within a PCO information element via a Create PDP Context Response or a Create Bearer Response message (message 2). The GGSN or the PGW also sends a CCR to the PCRF to request associated PCC rules (message 3). The PCRF in-turn provides PCC rules to be applied in a CCA (message 4).

The user equipment performs an initial registration towards a P-CSCF from the list provided in message 2 (message 5). In response, the P-CSCF sends a Rx Push response to the PCRF (message 6). The PCRF responses with a Rx Push Response message (message 7). The PCRF also uses a Gx Push procedure to provide the GGSN or PGW with the P-CSCF address (message 8). The GGSN or PGW will store the address for the user equipment and send a Gx Push Response to the PCRF (message 9). The GGSN or PGW will also begin to monitor the P-CSCF for potential failures. Thereafter, the P-CSCF sends a 200 OK message to the user equipment (message 10).

At some point, the GGSN or PGW may detect a P-CSCF failure via a Gi/sGi interface. Thereafter, the GGSN or PGW sends an Update PDP Context Request or Update Bearer Request message with a new PCO information element comprising a new list of P-CSCF addresses, which do not include the failed P-CSCF, to all user equipments associated with the failed P-CSCF address (message 11). The user equipment acknowledges the request with an Update PDP Context Response or Update Bearer Response message (message 12). Upon receiving the new list of P-CSCFs, if the P-CSCF in use is missing, each user equipment performs an initial registration towards a new P-CSCF (message 13).

As shown in FIG. 2, an example problem associated with current PMIPv6 based systems is that procedures for failures and updates do not have mechanisms that allow the PGW, which acts as a LMA, to initiate an update towards the SGW which acts as a MAG, to modify PDN connection related parameters, for example, a Protocol Configuration Option (PCO). This is an example difference with respect to GTPv2 based systems, where the PGW may use an Update Bearer Request message to update PDN connection related parameters. In some instances, the PGW may need to provide a new network address as well, for example a DNS address. However, this too is not possible with current PMIP based systems.

3GPP has introduced what is so called off-path signaling, which allows the PGW to pass some PDN connection related parameters via the PCRF to the SGW. However, such off-path signaling approach implies extra signaling over Gx and Gxx interface and unnecessarily requires the PCRF to function as a signaling relay node, which is not part of the defined functionality for the PCRF.

Thus, the example embodiments presented herein may be utilized to remedy the above mentioned problems. The example embodiments provide a mechanism in a PMIPv6 protocol stack, to allow a LMA, e.g. a PGW, to trigger a MAG initiated PMIP session update on an existing PDN connection without a PMIPv6 protocol violation.

According to some of the example embodiments, when there is a need to update certain PDN connection parameters, the LMA may send a message, for example, an Update Notification message or a Binding Revocation Request message with a new flag or a new cause code. The new flag/cause code shall trigger the MAG to re-establish a PMIPv6 session without releasing the user equipment PDN connection. Right after receiving the Binding Revocation Request or Update Notification message, the MAG node shall send a PBU (Proxy Binding Update) to re-establish the PMIPv6 session. The updated PDN connection parameters may be delivered by the PGW in a PBA (Proxy Binding Acknowledgement) message, at PMIPv6 session re-establishment procedure. The updated PDN connection parameters will then be forwarded to the user equipment via the MME. Utilizing the example embodiments, the LMA is allowed to update PDN connection parameters initially towards the MAG node, to provide PMIPv6 based systems a comparable mechanism to GTPv2 based systems.

Figure 3:
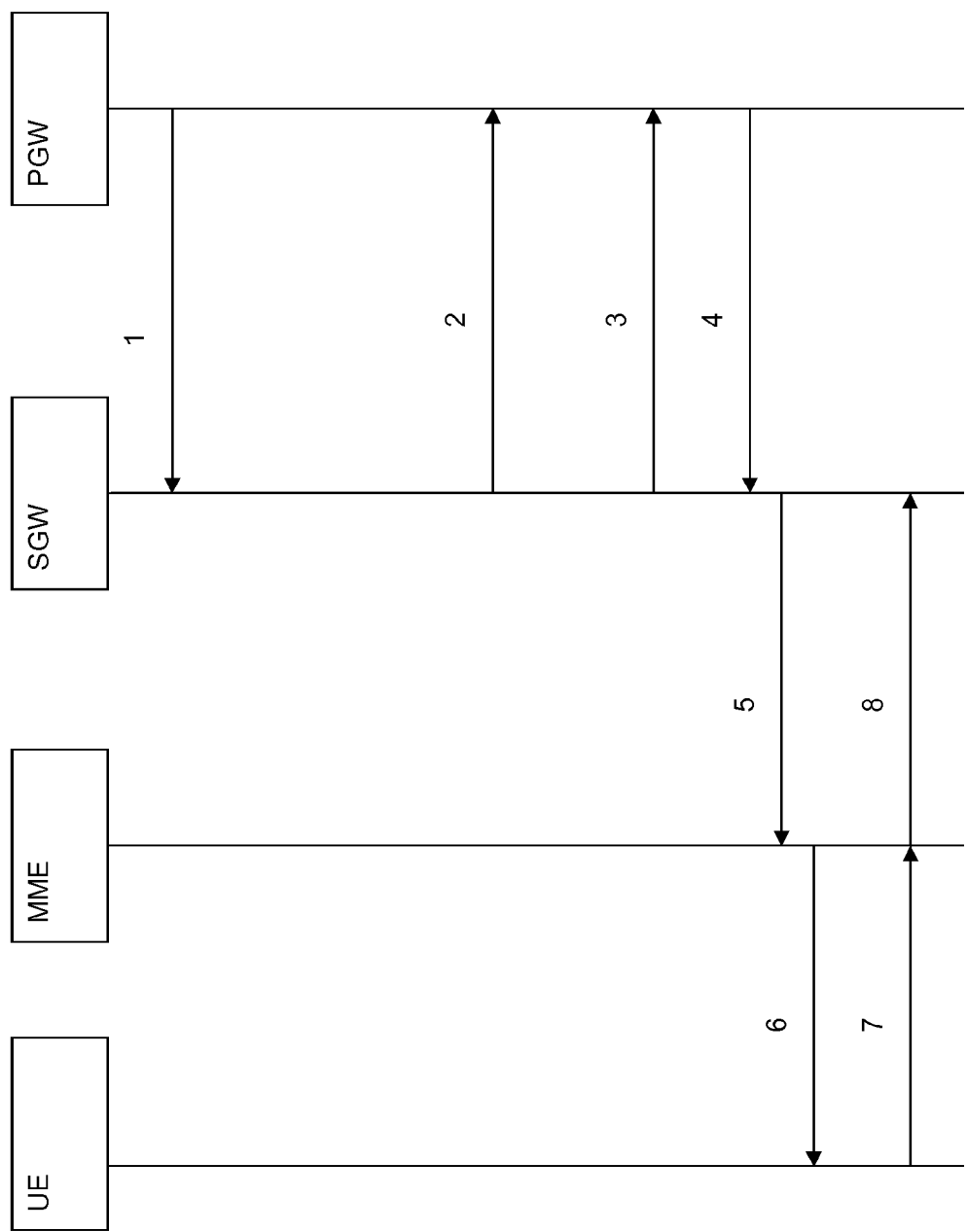
FIGS. 3 and 4 are message passing diagrams for a PMIP based network, according to some of the example embodiments.

FIG. 3 illustrates a network messaging diagram incorporating the use of a new cause code or flag, according to some of the example embodiments. First, the PGW or LMA sends a Binding Revocation Indication with a new information element (message 1). The information element may be in the form of a new cause code or cause code #8 and/or a new flag. For example, the new IE may be a PDN connections parameter update flag. The new cause code or the flag indicates that an immediately PMIPv6 binding reestablishment is requested. The PGW (or LMA) may keep the existing PDN connection data without allocating new resources. For example, the PGW may not initiate a new Gx procedure since the PGW will know that the user equipment has not been contacted when the PGW receives the new IE. The new IE or new cause code also indicates to the SGW (or MAG) if the PGW understands the new flag or new cause code when the SGW re-establishes the PDN connection using a PBU message.

Upon receiving the message comprising the new IE, the SGW (or MAG) acknowledges the Binding Revocation Indication by sending a Binding Revocation Acknowledgement to the PGW with a new IE which indicates "re-establishment will be requested" (message 2). The new IE sent by the SGW may be in the form of a flag and/or cause code setting. For example, the new IE may be a PDN connections parameter update acknowledgement flag. The SGW should not release any PDN connection data (context) such as the Gateway Control Session towards the PCRF. The SGW (MAG) also sends a PBU message to the PGW in order re-establish the PMIPv6 session with the PGW (LMA) (message 3).

Thereafter, the PGW sends a PBA message to confirm that the PMIP session reestablishment is accepted (message 4). The PBA message comprises updated PDN connection parameters. An example of an updated PDN connection parameter is PCO, which comprises an alternative P-CSCF address. The SGW send an Update Bearer Request with the updated PDN connection parameters to the MME (message 5). The MME sends a Modify EPS Bearer Context Request message to the user equipment (message 6). Thereafter, the user equipment responses to the MME with a Modify EPS Bearer Context Accept message (message 7). In response, the MME responses to the SGW with an Update Bearer Response message (message 8). Upon receiving the updated PDN connection parameters, the user equipment may initiate the corresponding network procedures, e.g., an IMS attachment with an alternative P-CSCF.

According to some of the example embodiments, instead of providing message 1 as described in FIG. 3, the PGW (LMA) may be configured to send a Binding Refresh or Binding Error message to the SGW (MAG). The sent message may comprise new 3GPP specific mobility options which indicate that the MAG shall perform a binding extension procedure for a specific PDN connection. In response to receiving the Binding Refresh or Binding Error message, the SGW (MAG) shall initiate the binding extension procedure.

Figure 4:
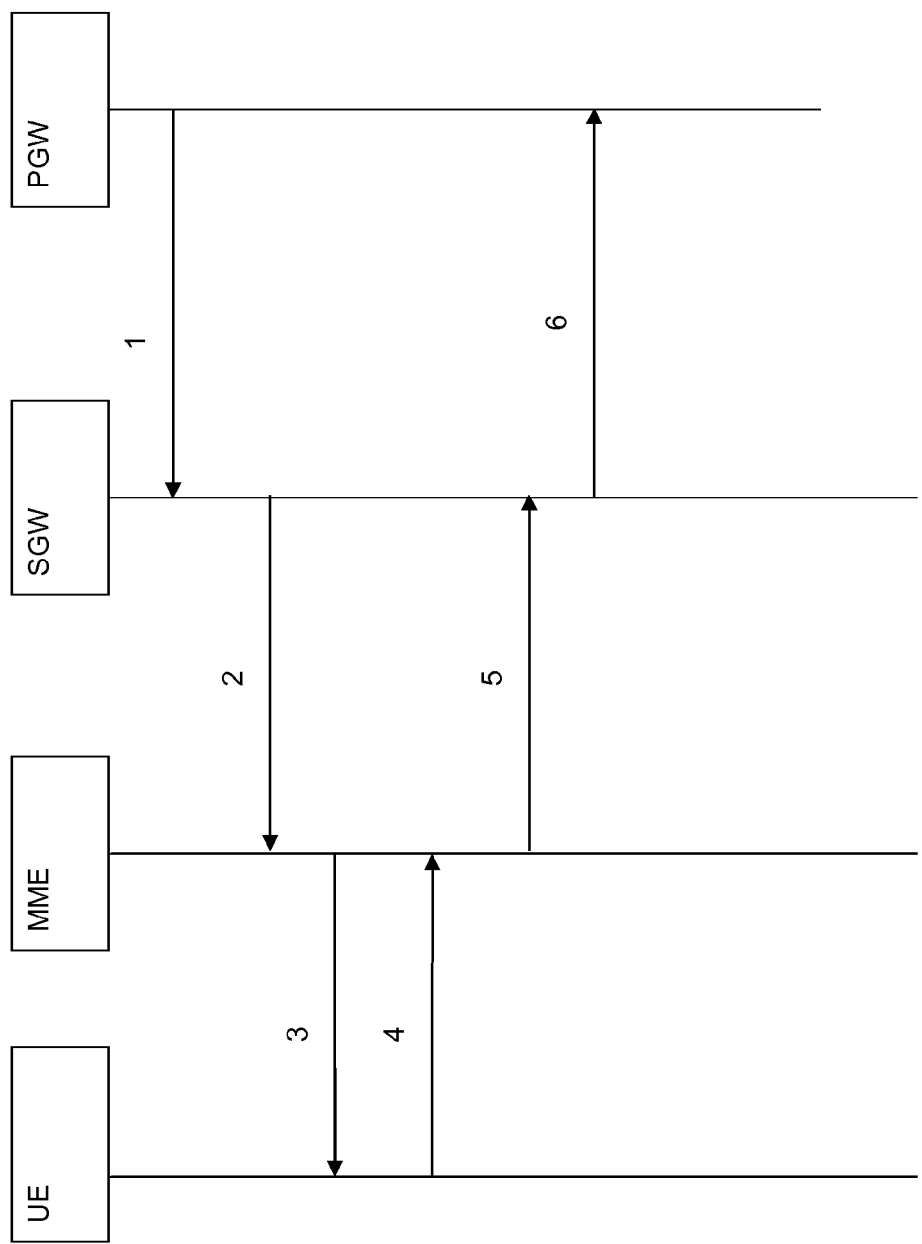

FIG. 4 illustrates another example embodiment which incorporates the usage of a new PMIP message, for example an Update Notification message. First, the PGW (LMA) sends a new PMIPv6 request message (e.g. "Binding Update Request" or "Update Notification message") with updated PDN connection parameters, e.g., a PCO which comprises an alternative P-CSCF address to the SGW (MAG) (message 1) and a notification indicator. Subsequently, the SGW (MAG) sends an Update Bearer Request with the updated PDN connection parameters to the MME (message 2). Thereafter, the MME sends a Modify EPS Bearer Context Request message to the user equipment (message 3). The user equipment responses to the MME with a Modify EPS Bearer Context Accept message (message 4). The MME responses to the SGW with Update Bearer Response message (message 5). Thereafter, the SGW responses to the PGW with a new PMIPv6 response message (e.g. "Binding Update Response" or "Update Notification Acknowledgement"). Upon receiving the updated PDN connection parameters, the user equipment shall initiate the corresponding network procedures, for example, an IMS attachment procedure with an alternative P-CSCF.

Figure 5:
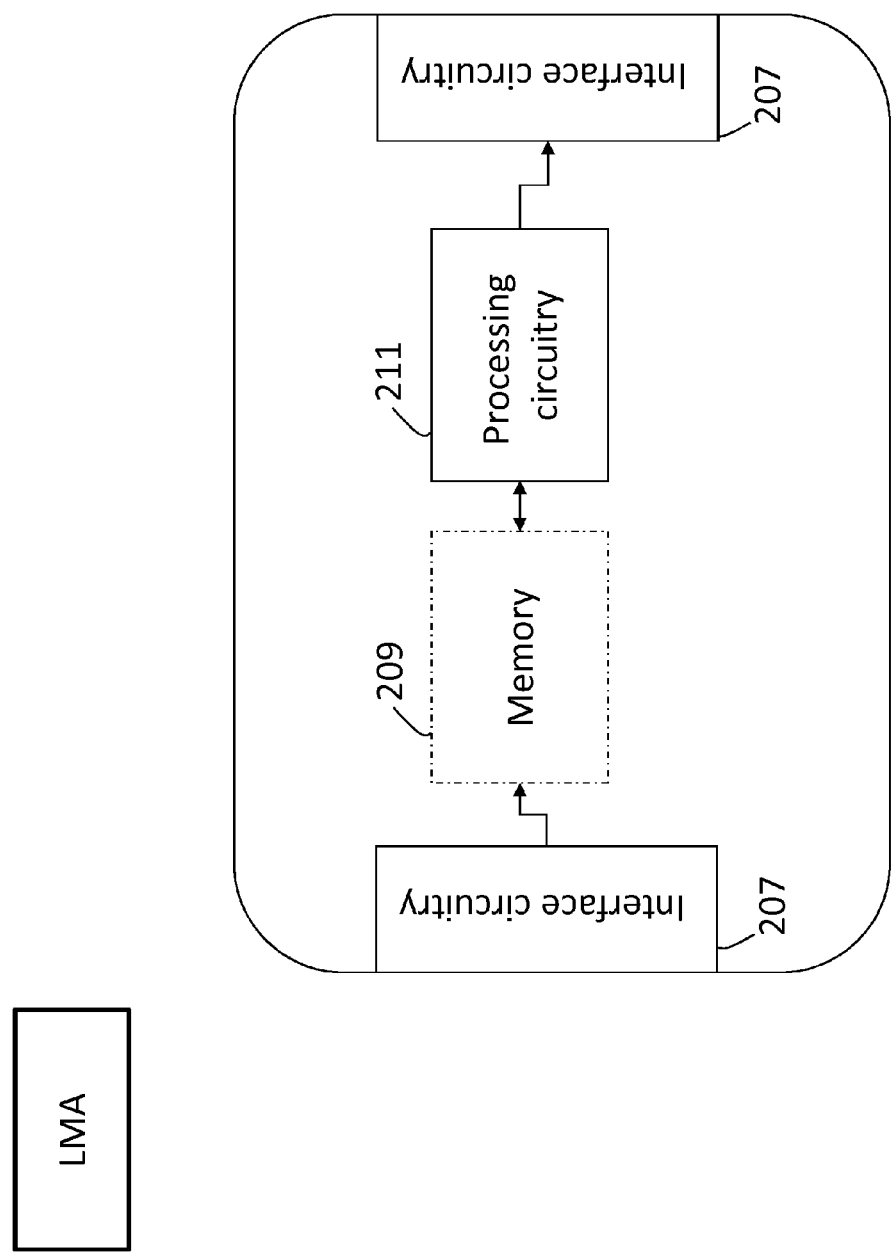
FIG. 5 is an example node configuration of a LMA node, according to some of the example embodiments.

FIG. 5 is an illustrative example of a LMA network node according to some of the example embodiments. The LMA network node may be a PGW node or a GGSN. The LMA network node may comprise interface circuitry 207. The interface circuitry 207 may be configured to receive and transmit any form of communications data. It should be appreciated that the LMA network node may comprise any number of units or interface circuitry 207 or a single transceiver port. It should further be appreciated that the interface circuitry 207 may be in the form of any input/output communications port or circuitry known in the art.

The LMA network node may further comprise at least one memory unit 209. The memory unit 209 may be configured to store received, transmitted, and/or measured data of any kind and/or executable program instructions. The memory unit 209 be any suitable type of computer readable memory and may be of a volatile and/or non-volatile type.

The LMA network node may also comprise processing circuitry 211 that may be configured to detect the need to perform an update and/or the presence of a failure.

It should be appreciated that the processing circuitry 211 may be any suitable type of computation unit, e.g. a microprocessor, digital signal processor (DSP), field programmable gate array (FPGA), or application specific integrated circuit (ASIC). It should also be appreciated that the processing circuitry 211 need not be comprised as a single unit. The processing circuitry 211 may be comprised as any number of units.

Figure 6:
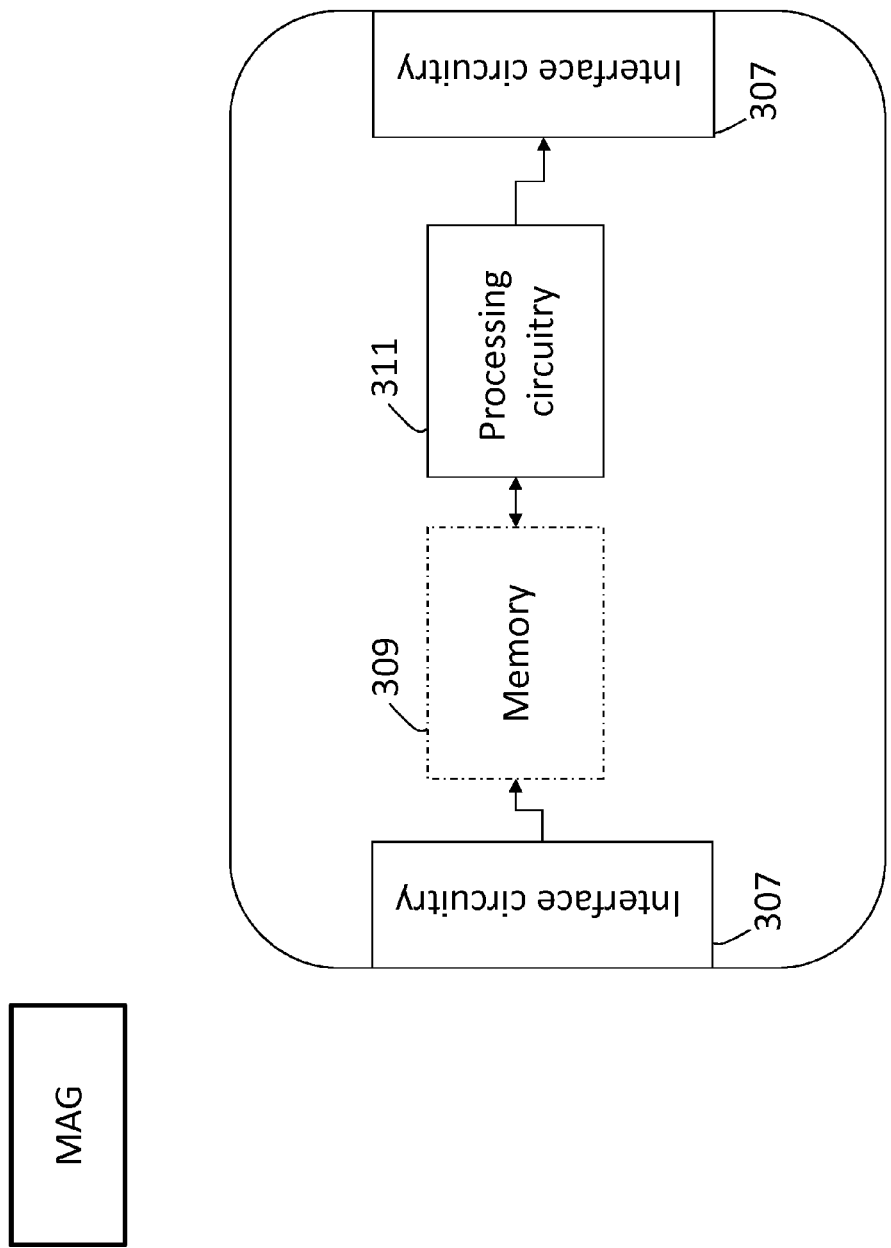
FIG. 6 is an example node configuration of a MAG node, according to some of the example embodiments.

FIG. 6 is an illustrative example of a MAG network node according to some of the example embodiments. The MAG network node may be a SGW, an EPDG or a trusted non-3GPP access (e.g., a trusted WLAN access). The MAG network node may comprise interface circuitry 307 which may be configured to receive and transmit any form of communications data. It should be appreciated that the MAG network node may comprise any number of interface circuitry units or a single interface circuitry unit. It should further be appreciated that the interface circuitry 307 may be in the form of any input/output communications port or circuitry known in the art.

The MAG network node may further comprise at least one memory unit 309. The memory unit 309 may be configured to store received, transmitted, and/or measured data of any kind and/or executable program instructions. The memory unit 309 be any suitable type of computer readable memory and may be of a volatile and/or non-volatile type. The MAG network node may also comprise processing circuitry 311. The processing circuitry 311 may be any suitable type of computation unit, e.g. a microprocessor, digital signal processor (DSP), field programmable gate array (FPGA), or application specific integrated circuit (ASIC). It should also be appreciated that the processing circuitry 311 need not be comprised as a single unit. The processing circuitry 311 may be comprised as any number of units.

Figure 7:
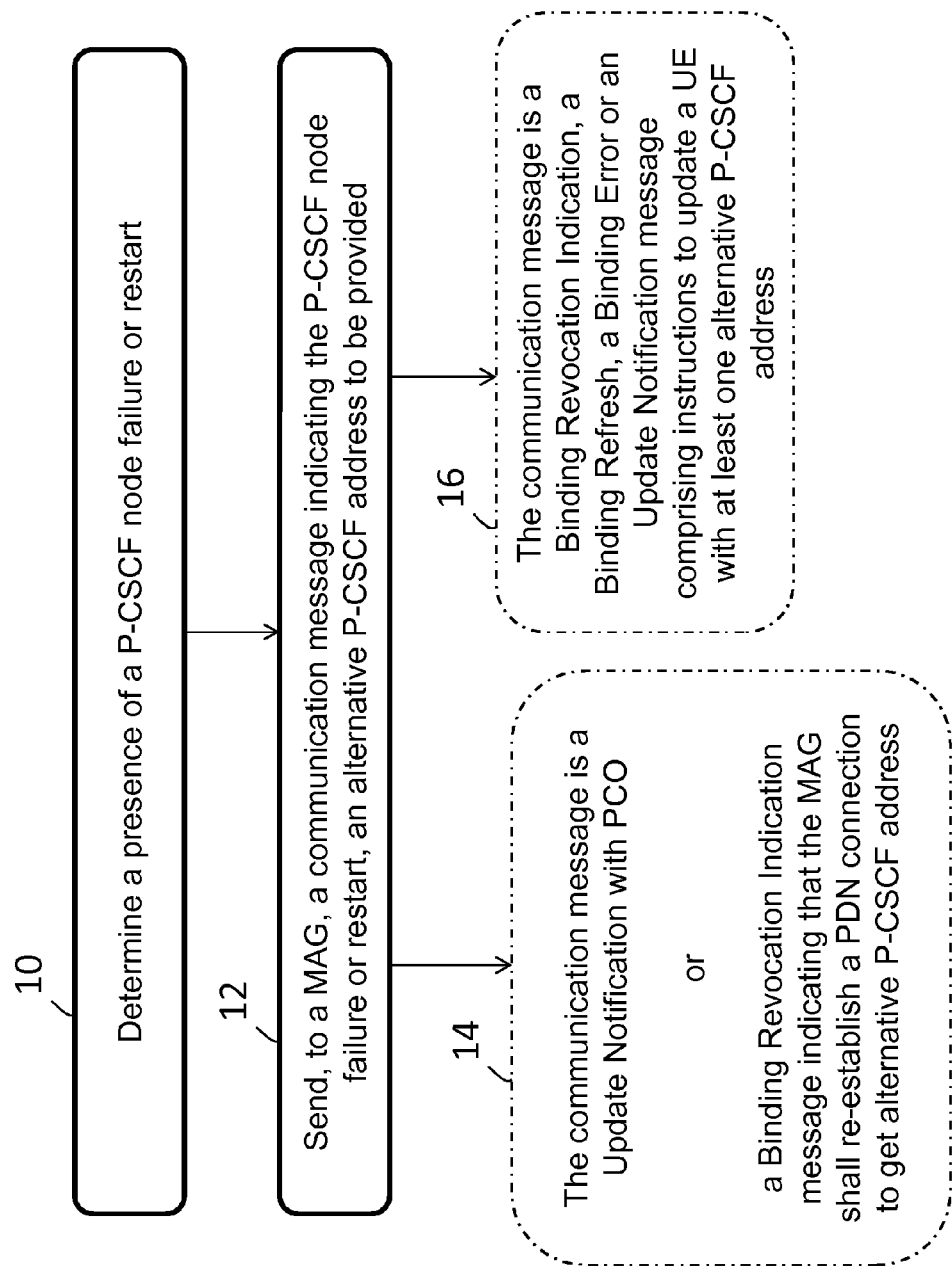
FIG. 7 is a flow diagram depicting example operations which may be taken by the LMA node of FIG. 5, according to some of the example embodiments.

FIG. 7 is a flow diagram depicting example operations which may be taken by the LMA node of FIG. 5 in the providing of an indication of P-CSCF node failure in a PMIP based network. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The LMA node is configured to determine 10 a presence of the P-CSCF node failure or restart. The processing circuitry 211 is configured to determine the presence of the P-CSCF node failure or restart.

According to some of the example embodiments, the LMA node may be determine the presence of the P-CSCF node failure or restart by monitoring the P-CSCF node, as explained with respect to FIG. 2. It should be appreciated that the LMA node may be configured to determine the presence of the P-CSCF node failure or restart by any other means. For example, the LMA node may receive or message or indication of the P-CSCF node failure or restart by any other node in the network.

It should be appreciated that, according to some of the example embodiments, the LMA node may be a PGW node or a GGSN. It should further be appreciated that the MAG node may be a SGW, ePDG or a trusted non-3GPP access. An example of a trusted non-3GPP access is a trusted WLAN access.

Operation 12

The LMA node is further configured to send, to a MAG node, a communication message. The communication message provides an indication of the P-CSCF node failure or restart in the PMIP based network. The interface circuitry 207 is configured to send, to the MAG node, the communication message.

According to some of the example embodiments, the indication of the P-CSCF node failure or restart may be provided via an information element. The information element may comprise a new or existing cause code and/or a flag, as explained with respect to FIG. 3. According to some of the example embodiments, the indication may be provided via the type of message sent, as explained with respect to FIG. 4. Thus, based on the information element comprised in the communication message or type of communication message sent, the MAG node may act accordingly.

Example Operation 14

According to some of the example embodiments, the sending 12 may further comprise the communication message being an Update Notification message comprising a PCO with an address list of new serving P-CSCF nodes, for example as described in FIG. 4. According to some of the example embodiments, the communication message may be a Binding Revocation Indication message comprising an indication to re-establish a PMIP session in order to get at least one alternative P-CSCF address, for example as described in FIG. 3.

Example Operation 16

According to some of the example embodiment, the sending 12 may further comprise the communication message being a Binding Refresh, a Binding Error or an Update Notification message comprising instructions for the MAG node in order to update a user equipment with at least one alternative P-CSCF address. According to some of the example embodiments, the instructions may be in the form of a new IE, as explained with respect to FIG. 3. The new IE may comprise a new or existing cause code and/or a flag. Based on the information comprised in the IE, the MAG node may perform the deletion as described above.

Figure 8:
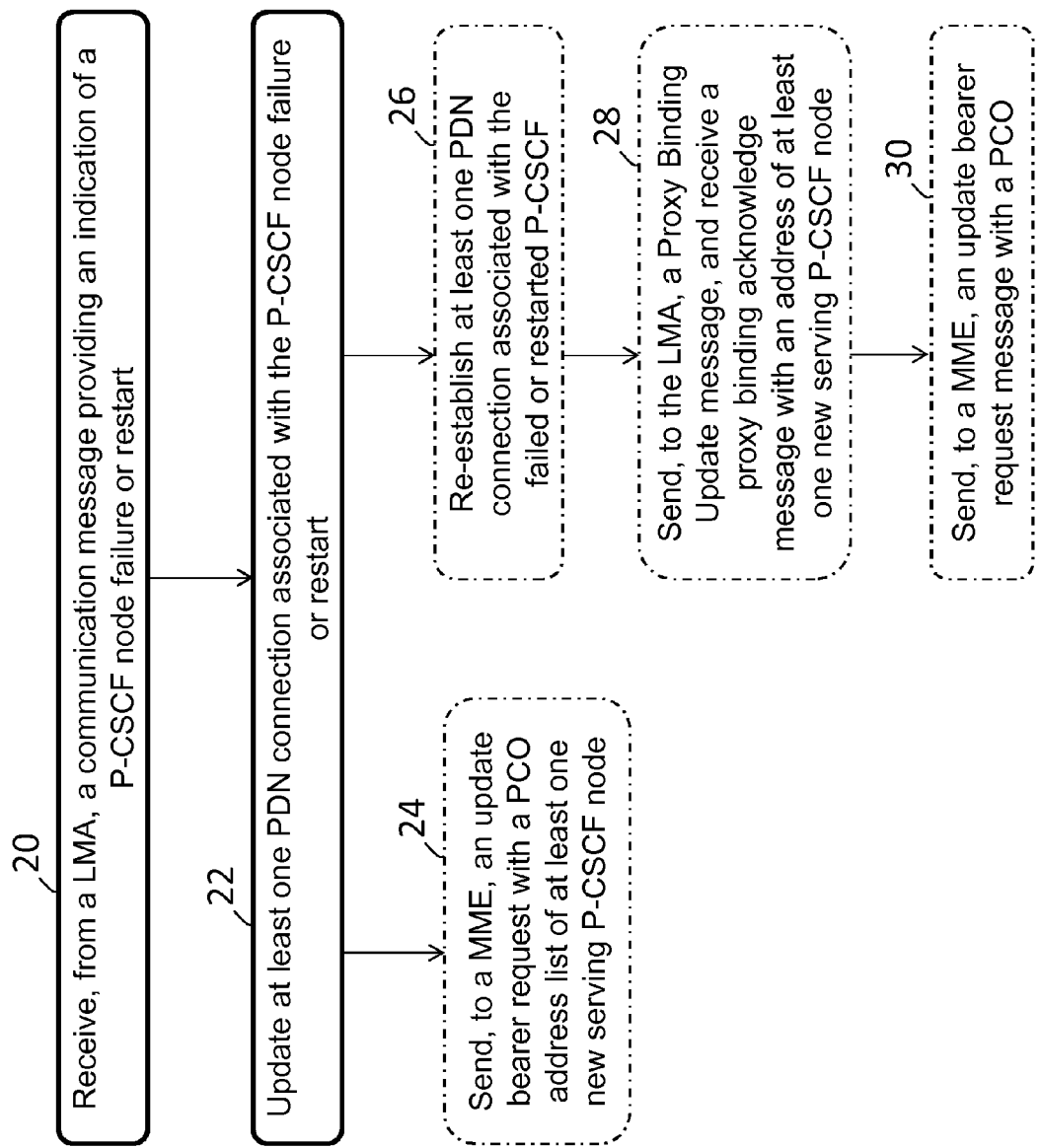
FIG. 8 is a flow diagram depicting example operations which may be taken by the MAG node of FIG. 6, according to some of the example embodiments.

FIG. 8 is a flow diagram depicting example operations which may be taken by the MAG node of FIG. 6 in the providing PMIP signalling in a presence of a P-CSCF node failure or restart. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 20

The MAG node is configured to receive 20, from a LMA node, a communication message. The communication message provides an indication of the P-CSCF node failure or restart in the PMIP based network. The interface circuitry 307 is configured to receive, from the LMA node, the communication message providing an indication of the P-CSCF node failure or restart in the PMIP based network.

It should be appreciated that, according to some of the example embodiments, the LMA node may be a PGW node or a GGSN. It should further be appreciated that the MAG node may be a SGW, ePDG or a trusted non-3GPP access. An example of a trusted non-3GPP access is a trusted WLAN access.

Operation 22

The MAG node is further configured to update 22 at least one PDN connection associated with the P-CSCF node failure or restart based on the communication message. The processing circuitry 311 is configured to update the at least one PDN connection associated with the P-CSCF node failure or restart based on the communication message.

Example Operation 24

According to some of the example embodiments, the communication message is an Update Notification comprising an address of a new serving P-CSCF node or a Binding Revocation Indication message comprising an indication to re-establish the PMIP session in order to get at least one alternative P-CSCF address. The updating 22 may further comprise sending 24, to a MME, an Update Bearer Request message. The Update Bearer Request message may comprise a PCO with an address list of at least one new serving P-CSCF node. The interface circuitry 307 may be configured to send the Update Bearer Request message to the MME. The sending of the Update Bearer Request message is further explained with respect to FIGS. 3 and 4.

Example Operation 26

According to some of the example embodiments, the communication message may be a Binding Revocation Indication, a Binding Refresh, a Binding Error or an Update Notification message. The updating 22 may further comprise re-establishing 26 at least one PDN connection associated with the failed or restarted P-CSCF node. The processing circuitry 311 may be configured to re-establish the at least one PDN connection associated with the failed or restarted P-CSCF node.

Example Operation 28

According to some of the example embodiments, the updating 22 and re-establishing 26 may further comprise sending 28, to the LMA node, a Proxy Binding Update message to re-establish the at least one PDN connection, and receiving Proxy Binding Acknowledge message with an address of new serving P-CSCF node. The interface circuitry 307 is configured to send, to the LMA node, the Proxy Binding Update message to re-establish the at least one PDN connection with the new serving P-CSCF node.

Example Operation 30

According to some of the example embodiments, the updating 22, re-establishing 26 and sending 28 may further comprise sending 30, to a MME node, an Update Bearer Request message comprising a PCO with an address list of the new serving P-CSCF node. The interface circuitry 307 may be configured to send, to the MME node, the Updated Bearer Request message comprising the PCO with the address list of the new serving P-CSCF node. Example Operations 26-30 are further described with respect to FIG. 3.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following example embodiments.

The invention claimed is:

1. A method for providing an indication of a Proxy-Call Session Control Function (P-CSCF) node failure or restart in a Proxy Mobile Internet Protocol (PMIP) based network, the method comprising:

determining, by a Local Mobility Anchor (LMA) node, a presence of the P-CSCF node failure or restart; and the LMA node sending, to a Mobile Access Gateway (MAG) node, a communication message, said communication message comprising a flag or cause code, or being of a message type, providing an indication of the P-CSCF node failure or restart in the PMIP based network and further providing an indication to re-establish a PMIP session without releasing a PDN connection.

2. The method of claim 1, wherein the LMA node is a Packet Data Network Gateway (PGW) node or a Gateway General Packet Radio Service Support Node (GGSN).

3. The method of claim 1, wherein the MAG node is a Serving Gateway (SGW), an Enhanced Packet Data Gateway (ePDG) or a trusted non-3GPP access.

4. The method of claim 1, wherein the communication message is an Update Notification message comprising a Protocol Configuration Option (PCO) with an address list of new serving P-CSCF nodes.

5. The method of claim 1, wherein the communication message is a Binding Revocation Indication message comprising an indication to re-establish a PMIP session in order to get at least one alternative P-CSCF address.

6. The method of claim 1, wherein the communication message is a Binding Revocation Indication, a Binding Refresh, a Binding Error, or an Update Notification message comprising instructions for the MAG node in order to update a user equipment with at least one alternative P-CSCF address.

7. The method of claim 1, further comprising:

the MAG node sending, to the LMA node, a second communication acknowledgement message in response to the communication message sent by the LMA node;

the MAG node sending, to the LMA node, a third communication message in response to the communication message sent by the LMA node, said third communication message comprising a message to re-establish at least one PDN connection with a new serving P-CSCF node; and the LMA node sending, to the MAG node, a fourth communication message in response to the third communication message, said fourth communication message comprising updated PDN connection parameters.

8. The method of claim 7, further comprising:

the MAG node sending, to a Mobility Management Entity (MME), a fifth communication message in response to receiving the fourth communication message, said fifth communication message comprising the updated PDN connection parameters;

the MME sending, to a user equipment (UE), a sixth communication message in response to the fifth communication message, said sixth communication message comprising a Modify EPS Bearer Context Request message, wherein the UE is configured to send to the MME a seventh communication message in response to the sixth communication message, said seventh communication message comprising a Modify EPS Bearer Context Accept message; and the MME sending, to the MAG node, an eight communication message in response to receiving the seventh communication message, said eighth communication message comprising an Update Bearer Response Message.

9. The method of claim 1, wherein the communication message is an Update Notification Message or a Binding Update Request with updated PDN connection parameters, the method further comprising:

the MAG sending, to a Mobility Management Entity (MME), a second communication message in response to the communication message, wherein the second communication message comprises the updated PDN connection parameters; and the MME sending, to a User Equipment (UE), a third communication message in response to the second communication message, wherein the third communication message comprises a Modify EPS Bearer Context Request message.

10. The method of claim 9, further comprising, the MME receiving, from the UE, a fourth communication message in response to the third communication message, wherein the fourth communication message comprises a Modify EPS Bearer Context Accept message;

the MME sending, to the MAG node, a fifth communication message in response to the fourth communication message, the fifth communication message comprising an Update Bearer Response message; and, the MAG node sending, to the LMA node, a sixth communication message in response to the fifth communication message, the sixth communication message comprising a PMIP response message.

11. A Local Mobility Anchor (LMA) node for providing an indication of a Proxy-Call Session Control Function (P-CSCF) node failure or restart in a Proxy Mobile Internet Protocol (PMIP) based network, the LMA node comprising:

processing circuitry configured to determine a presence of the P-CSCF node failure or restart; and interface circuitry configured to send, to a Mobile Access Gateway (MAG) node, a communication message, said communication message comprising a flag or cause code, or being of a message type, providing an indication of the P-CSCF node failure or restart in the PMIP based network and further providing an indication to re-establish a PMIP session without releasing a PDN connection.

12. The LMA node of claim 11, wherein the LMA node is a Packet Data Network Gateway (PGW) node or a Gateway General Packet Radio Service Support Node (GGSN).

13. The LMA node of claim 11, wherein the MAG node is a Serving Gateway (SGW), an Enhanced Packet Data Gateway (ePDG) or a trusted non-3GPP access.

14. The LMA node of claim 11, wherein the communication message is an Update Notification message comprising a Protocol Configuration Option (PCO) with an address list of new serving P-CSCF nodes.

15. The LMA node of claim 11, wherein the communication message is a Binding Revocation Indication message comprising an indication to re-establish a PMIP session in order to get at least one alternative P-CSCF address.

16. The LMA node of claim 11, wherein the communication message is a Binding Revocation Indication, a Binding Refresh, a Binding Error, or an Update Notification message comprising instructions for the MAG node to in order to update a user equipment with at least one alternative P-CSCF address.

17. A method, in a Mobile Access Gateway (MAG) node, for Proxy Mobile Internet Protocol (PMIP) signalling in a presence of a Proxy-Call Session Control Function (P-CSCF) node failure or restart in a Proxy Mobile Internet Protocol (PMIP) based network, the method comprising:

receiving, from a Local Mobility Anchor (LMA) node, a communication message, said communication message comprising a flag or cause code, or being of a message type, providing an indication of the P-CSCF node failure or restart in the PMIP based network and further providing an indication to re-establish a PMIP session without releasing a PDN connection; and updating at least one Packet Data Network (PDN) connection associated with the P-CSCF node failure or restart based on the communication message.

18. The method of claim 17, wherein the LMA node is a Packet Data Network Gateway (PGW) node or a Gateway General Packet Radio Service Support Node (GGSN).

19. The method of claim 17, wherein the MAG node is a Serving Gateway (SGW), an Enhanced Packet Data Gateway (ePDG) or a trusted non-3GPP access.

20. The method of claim 17, wherein the communication message is an Update Notification comprising an address of a new serving P-CSCF node or a Binding Revocation Indication message comprising an indication to re-establish the PMIP session in order to get at least one alternative P-CSCF address, wherein the updating further comprises:

sending, to a Mobility Management Entity (MME), an Update Bearer Request with a Protocol Configuration Option (PCO) comprising an address list of the new serving P-CSCF node.

21. The method of claim 17, wherein the communication message is a Binding Revocation Indication, a Binding Refresh, a Binding Error or an Update Notification message, wherein the updating further comprises:

re-establishing at least one PDN connection associated with the failed or restarted P-CSCF node;

sending, to the LMA node, a Proxy Binding Update message to re-establish the at least one PDN connection with a new serving P-CSCF node; and sending, to a Mobility Management Entity (MME), an Update Bearer Request message comprising a Protocol Configuration Option (PCO) with an address list of the new serving P-CSCF node.

22. A Mobile Access Gateway (MAG) node for Proxy Mobile Internet Protocol (PMIP) signalling in a presence of a Proxy-Call Session Control Function (P-CSCF) node failure or restart in a Proxy Mobile Internet Protocol (PMIP) based network, the MAG node comprising:

interface circuitry configured to receive, from a Local Mobility Anchor (LMA) node, a communication message, said communication message comprising a flag or cause code, or being of a message type, providing an indication of the P-CSCF node failure or restart in the PMIP based network and further providing an indication to re-establish a PMIP session without releasing a PDN connection; and processing circuitry configured to update at least one Packet Data Network (PDN) connection associated with the P-CSCF node failure or restart based on the communication message.

23. The MAG node of claim 22, wherein the LMA node is a Packet Data Network Gateway (PGW) node or a Gateway General Packet Radio Service Support Node (GGSN).

24. The MAG node of claim 22, wherein the MAG node is a Serving Gateway (SGW), an Enhanced Packet Data Gateway (ePDG) or a trusted non-3GPP access.

25. The MAG node of claim 22, wherein the communication message is an Update Notification comprising an address of a new serving P-CSCF node or a Binding Revocation Indication message comprising indication to re-establish the PMIP session in order to get at least one alternative P-CSCF address, wherein the interface circuitry is further configured to sending, to a Mobility Management Entity (MME), an Update Bearer Request with a Protocol Configuration Option (PCO) comprising an address list of the new serving P-CSCF node.

26. The MAG node of claim 22, wherein the communication message is a Binding Revocation Indication, a Binding Refresh, a Binding Error or an Update Notification message, wherein:
- the processing circuitry is further configured to re-establish at least one PDN connection associated with the failed or restarted P-CSCF node;
- the interface circuitry is further configured to send, to the LMA node, a Proxy Binding Update message to re-establish the at least one PDN connection with a new serving P-CSCF node; and
- the interface circuitry is also configured to send, to a Mobility Management Entity (MME), an Update Bearer Request message comprising a Protocol Configuration Option (PCO) with an address list of the new serving P-CSCF node.

\* \* \* \* \*

UNITED STATES PATENT AND TRADEMARK OFFICE
CERTIFICATE OF CORRECTION

PATENT NO. : 9,313,094 B2
APPLICATION NO. : 13/661067
DATED : April 12, 2016
INVENTOR(S) : Qiang et al.

Page 1 of 1

It is certified that error appears in the above-identified patent and that said Letters Patent is hereby corrected as shown below:

In the claims,

In Column 13, Line 55, in Claim 16, delete "to in" and insert -- in --, therefor.

Signed and Sealed this
Fifth Day of July, 2016

Michelle K. Lee
*Director of the United States Patent and Trademark Office*